US012221052B2

United States Patent
Rommelfanger et al.

(10) Patent No.: US 12,221,052 B2
(45) Date of Patent: Feb. 11, 2025

(54) IMPACT PROTECTION DEVICE, MOTOR VEHICLE AND METHOD OF OPERATING AN IMPACT PROTECTION DEVICE

(71) Applicant: Dr. Ing. h.c. F. Porsche Aktiengesellschaft, Stuttgart (DE)

(72) Inventors: Christian Rommelfanger, Bad Liebenzell (DE); Philipp Bolay, Flacht (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 18/408,596

(22) Filed: Jan. 10, 2024

(65) Prior Publication Data
US 2024/0239288 A1    Jul. 18, 2024

(30) Foreign Application Priority Data

Jan. 12, 2023   (DE) ...................... 10 2023 100 568.5

(51) Int. Cl.
B60R 21/205        (2011.01)
(52) U.S. Cl.
CPC .................. B60R 21/205 (2013.01)
(58) Field of Classification Search
CPC .... B60R 21/205; H04B 1/3888; H04M 1/185; A45C 2011/002; A45C 2011/003; A45C 11/00
See application file for complete search history.

(56) References Cited

U.S. PATENT DOCUMENTS

| | | | |
|---|---|---|---|
| 10,239,620 B2 | 3/2019 | Strobl et al. | |
| 10,405,440 B2 * | 9/2019 | Burdoucci | H04M 1/185 |
| 11,529,922 B2 | 12/2022 | Mihm et al. | |
| 2017/0050602 A1 * | 2/2017 | Vinton | B60N 2/809 |

FOREIGN PATENT DOCUMENTS

| | | | | |
|---|---|---|---|---|
| CN | 111824059 A | * | 10/2020 | B60R 21/205 |
| DE | 102013200667 A1 | | 7/2014 | |
| DE | 102014113277 A1 | | 3/2016 | |
| DE | 102016115156 A1 | | 2/2017 | |
| DE | 102020124346 A1 | | 3/2022 | |
| DE | 102022109957 A1 | | 11/2022 | |
| EP | 3152087 B1 | | 11/2019 | |

OTHER PUBLICATIONS

Farooq, CN-111824059-A, Machine Translation of Specification (Year: 2020).*

* cited by examiner

*Primary Examiner* — Paul N Dickson
*Assistant Examiner* — Matthew Joseph Ganci
(74) *Attorney, Agent, or Firm* — LEYDIG, VOIT & MAYER, LTD.

(57) ABSTRACT

An impact protection device for an occupant of a motor vehicle in a vehicle interior, in which a display device with a display is arranged, with which an airbag arrangement is associated, the impact protection device including at least one airbag which is filled with gas and deploys when the impact protection device is activated. The airbag arrangement is configured and arranged such that the airbag surrounds at least one edge on the display facing the occupant of the motor vehicle when the impact protection device is activated.

11 Claims, 2 Drawing Sheets

IMPACT PROTECTION DEVICE, MOTOR VEHICLE AND METHOD OF OPERATING AN IMPACT PROTECTION DEVICE

CROSS REFERENCE TO RELATED APPLICATIONS

This application claims benefit to German Patent Application No. DE 10 2023 100 568.5, filed on Jan. 12, 2023, which is hereby incorporated by reference herein.

FIELD

The invention relates to an impact protection device for an occupant of a motor vehicle in a vehicle interior, to a motor vehicle with such an impact protection device, and to a method for operating such an impact protection device in a motor vehicle.

BACKGROUND

The German disclosure document DE 10 2013 200 667 A1 discloses a retaining device with an airbag associated with a headrest of a motor vehicle which unfolds to the chest and/or head of an occupant when the retaining device is activated, wherein a receptacle projecting in the direction of the seat surface of the vehicle seat is provided on an upper section of the headrest, from which receptacle the airbag can unfold from above in front of the head and/or chest of the occupant at a distance from a backrest of the vehicle seat. The German disclosure document DE 10 2014 113 277 A1 discloses an aircraft seating device with at least one aircraft seat, and with at least one console which, viewed in a flight direction, is arranged in front of the aircraft seat, and with at least one airbag element which is intended to protect a passenger seated in the aircraft seat from an impact on the console in the event of a crash. The European patent specification EP 3 152 087 B1 discloses a dashboard with an airbag assembly.

SUMMARY

In an embodiment, the present disclosure provides an impact protection device for an occupant of a motor vehicle in a vehicle interior, in which a display device with a display is arranged, with which an airbag arrangement is associated, the impact protection device comprising at least one airbag which is filled with gas and deploys when the impact protection device is activated. The airbag arrangement is configured and arranged such that the airbag surrounds at least one edge on the display facing the occupant of the motor vehicle when the impact protection device is activated.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
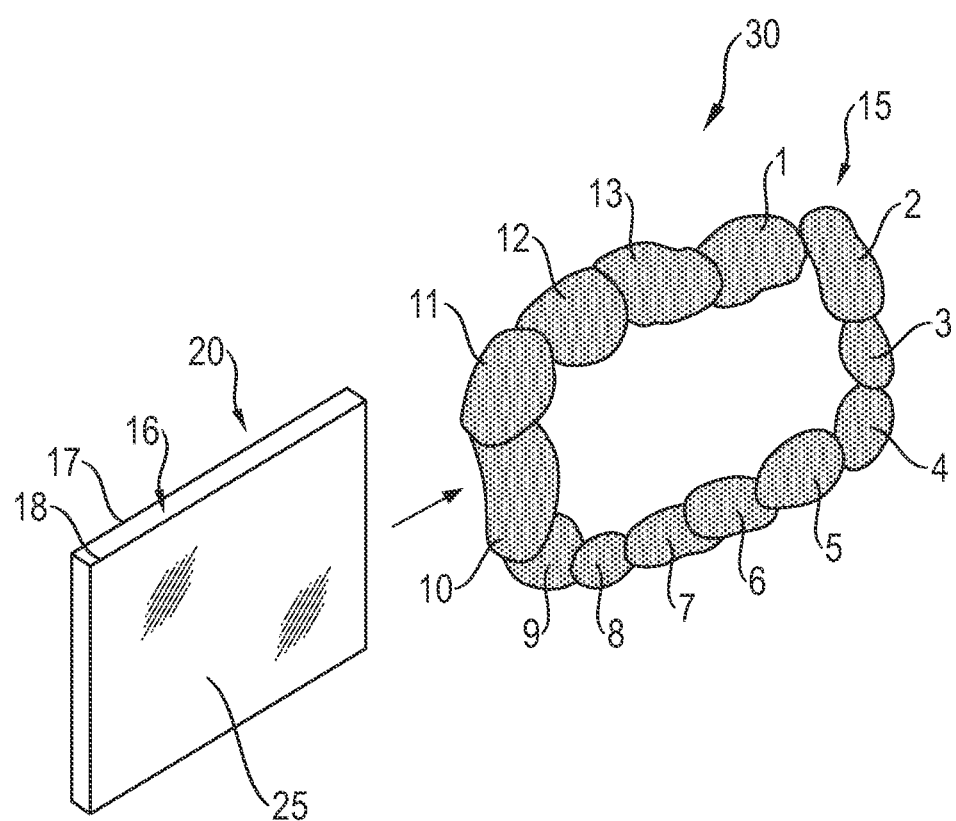
FIG. 1 illustrates a simplified exploded view of an impact protection device with a total of thirteen airbags, which completely surround a peripheral edge region of a display of a display device when the impact protection device is activated.

In an embodiment, the present invention improves occupant protection in motor vehicles.

An impact protection device is provided for an occupant of a motor vehicle in a vehicle interior, in which a display device with a display is arranged, with which an airbag arrangement is associated, which comprises at least one airbag which is filled with gas and deploys when the impact protection device is activated, in that the airbag arrangement is designed and arranged in such a way that the airbag surrounds at least one edge on the display facing the occupant of the motor vehicle when the impact protection device is activated. The display of the display device can be integrated into an interior trim panel in the vehicle interior. However, the display device with the display can also be arranged free-standing or freely suspended in the interior of the vehicle. The display device with the display can also be fully or partially extendable or fold-out in the vehicle interior. An edge of the display is advantageously not visible on the display device. A display surface or its glass can be curved around an edge region of the display device with the display. Particularly in the case of a free-standing or freely suspended arrangement of the display device with the display in the vehicle interior, it must be firmly anchored to a supporting structure of the motor vehicle in order to prevent unwanted shaking during driving. The airbag surrounding the edge of the display facing the occupant of the vehicle can be used to absorb kinetic energy, for example in the event of a head impact in the vehicle interior.

A preferred embodiment example of the impact protection device is characterized in that the airbag arrangement is designed and arranged in such a way that the airbag surrounds the display from a rear side of the display device when the impact protection device is activated. One of the advantages of this is that the display can be borderless, as is common with modern smartphones.

A preferred embodiment example of the impact protection device is characterized in that the airbag arrangement is designed and arranged in such a way that the airbag surrounds a peripheral edge region of the display device in a U-shape when the impact protection device is activated. This effectively improves impact protection, especially for free-standing or free-hanging displays in the vehicle interior.

A preferred embodiment example of the impact protection device is characterized in that the airbag arrangement comprises multiple airbags that surround the display. The airbag arrangement advantageously comprises so many airbags that, arranged in a row, they essentially surround the entire peripheral edge region of the display of the display device in a U-shape. This enables highly effective impact absorption, especially for free-standing or freely suspended interior displays.

A preferred embodiment example of the impact protection device is characterized in that the display is arranged freely in the vehicle interior, at least partially and/or temporarily. Partial in this context means, for example, that the display is not completely free-standing in the interior, but only protrudes into the vehicle interior with one edge or a partial area. In this context, temporary means that the display can be extended, for example, and is only arranged freely in the vehicle interior when extended or folded out. The display can be located at the front of the vehicle interior, for example above a dashboard in the area of the windshield. However, the display can also be mounted in a rear area of the vehicle interior, for example on the rear side of a front seat or a headrest of a front seat. If the display is partially or temporarily arranged as free-standing in the vehicle interior, the impact absorption required to prevent serious injuries in the event of a head impact is particularly important.

A preferred embodiment example of the impact protection device is characterized in that the display device has a receptacle for the airbag or airbags on its rear side. The receptacle is designed, for example, as a hollow space or cavity on the rear side of the display device. The receptacle is advantageously large enough to accommodate not only the airbag or airbags, but preferably also a gas generator, which is used to inflate the airbag or airbags. The receptacle on the rear side of the display device ensures innovative impact absorption even when the display device is arranged as free-standing or freely suspended in the vehicle interior.

A preferred embodiment example of the impact protection device is characterized in that the airbag arrangement comprises a bistable retaining and guiding structure which holds the airbag or airbags in the non-activated state of the impact protection device, and which provides a guide for the airbag or airbags in the activated state of the impact protection device. This is a simple way of providing innovative active impact absorption surrounding the display. The bistable retaining and guiding structure advantageously comprises clamps which, in the non-activated state of the impact protection device, are folded or collapsed in such a way that they take up very little space. When the impact protection device is activated, the clamps advantageously take on an essentially U-shaped form, which provides the desired guidance for the airbag.

An embodiment of the invention also relates to a motor vehicle with an impact protection device as described above. The impact protection device can be assigned to different displays in the vehicle interior. The displays are preferably, at least partially or temporarily, free-standing or freely suspended in the vehicle interior.

In a method for operating a previously described impact protection device in a motor vehicle, the above task is alternatively or additionally solved in that the airbag surrounds at least one edge of the display facing the occupant of the motor vehicle when the impact protection device is activated. This is a simple way of ensuring innovative impact absorption to prevent serious injuries when the head hits the display.

An embodiment of the invention also relates to an airbag arrangement, an airbag, a display device, a display, a rear panel, a receptacle and/or a retaining and guiding structure for a previously described impact protection device. The aforementioned parts can be purchased separately.

Further advantages, features, and details of embodiments of the invention arise from the following description, in which various embodiment examples of the invention are described in detail with reference to the drawings.

Figure 2:
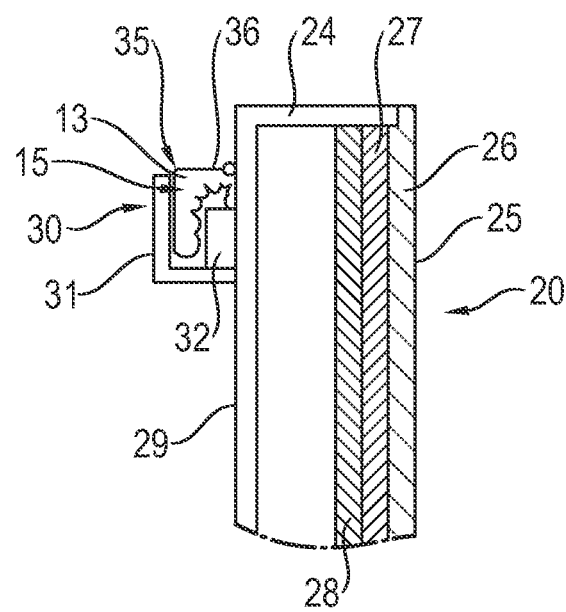
FIG. 2 illustrates a partial view of a section through the impact protection device of FIG. 1 in a non-activated state.
Figure 3:
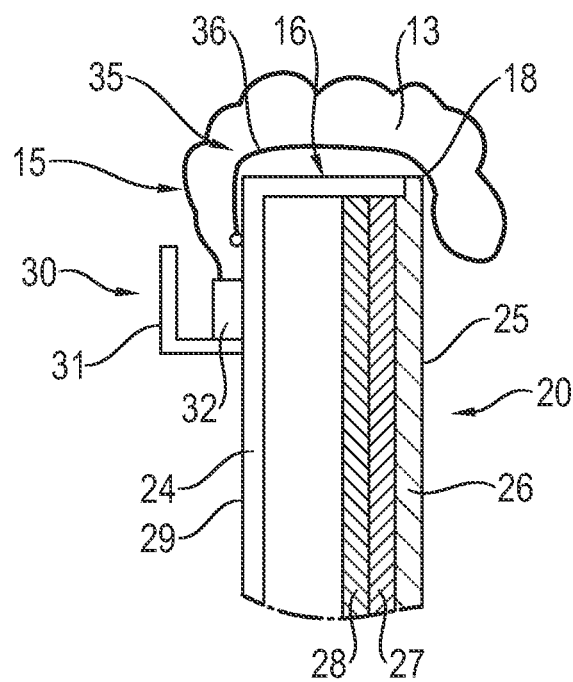
FIG. 3 illustrates the impact protection device in the same view as in FIG. 2 in the activated state.

FIGS. 1 through 3 show a display device 20 with a display 25 and with an impact protection device 30 in various views, as well as in FIG. 2 in the non-activated state and FIG. 3 in the activated state of the impact protection device 30. The impact protection device 30 comprises an airbag arrangement 15 with a total of thirteen airbags 1 through 13.

The airbags 1 through 13 of the airbag arrangement 15 are designed and arranged in such a way that, when the impact protection device 30 is activated, the airbags 1 through 13 surround a peripheral edge region 16 of the display device 20, preferably substantially in a U-shape. In this way, the airbag arrangement 15 can be used with the impact protection device 30 to realize a surrounding active impact absorption, particularly in the area of edges 17, 18 on the display device 20.

In the sectional view of FIGS. 2 and 3, it can be seen that the display device 20 comprises an essentially cuboid housing 24 with a display glass 26, which serves to represent the display 25 on a front side of the housing 24. An imaging film 27 and a circuit board 28 with electronic components are arranged behind the display glass 26.

On a rear side 29 of the housing 24, the impact protection device 30 comprises a receptacle 31 for the airbag arrangement 15 with the thirteen airbags, of which only the airbag 13 can be seen in the sectional view of FIGS. 2 and 3. The receptacle 31 is used to represent a hollow space or a cavity in which a gas generator 32 is accommodated in addition to the airbag arrangement 15. The gas generator 32 is used to inflate the thirteen airbags when the impact protection device 30 is activated.

The airbag arrangement 15 is equipped with a bistable retaining and guiding structure 35 for the thirteen airbags. The bistable retaining and guiding structure 35 comprises at least one clamp 36 for each of the thirteen air bags. In the non-activated state of the impact protection device 30, the clamp 36 is accommodated in the receptacle 31 on the rear side 29 of the housing 24 of the display device 20.

When the impact protection device 30 is activated, the clamp 36 of the bistable retaining and guiding structure 35 jumps from its retaining position shown in FIG. 2 to its guiding position shown in FIG. 3, in which the clamp 36, as can be seen in FIG. 3, surrounds the U-shaped edge region 16 of the display device 20 in a U-shape.

This is a simple way of ensuring that the airbag 13 in its unfolded state shown in FIG. 3 surrounds the peripheral edge region 16 of the display device 20 with the edge 18 facing the interior on the display 25 in a protective manner.

If the gas generator 32 is triggered when the impact protection device 30 is activated, the clamp 36 moves over the edge 18 of the display 25 and pulls the airbag 13 with it. For example, the clamp 36 is formed from bent spring steel. The clamp 36 is advantageously sewn to the airbag 13 and pretensioned in its guide position.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMBERS

1 Airbag
2 Airbag
3 Airbag
4 Airbag
5 Airbag
6 Airbag
7 Airbag
8 Airbag
9 Airbag
10 Airbag
11 Airbag
12 Airbag
13 Airbag
15 Airbag arrangement
16 Peripheral edge region
17 Edge
18 Edge
20 Display device
24 Housing
25 Display
26 Display
27 Imaging film
28 Circuit board
29 Rear side
30 Impact protection device
31 Receptacle
32 Gas generator
35 Bistable retaining and guiding structure
36 Clamp

The invention claimed is:

1. An impact protection device for an occupant of a motor vehicle in a vehicle interior, in which a display device with a display is arranged, with which an airbag arrangement is associated, the impact protection device comprising at least one airbag which is filled with gas and deploys when the impact protection device is activated,
wherein the airbag arrangement is configured and arranged such that, when the impact protection device is activated, the at least one airbag surrounds the display, starting from a rear side of the display device and surrounding a peripheral edge region of the display device in a U-shape, and an at least one edge on the display facing the occupant of the motor vehicle.

2. The impact protection device according to claim 1, wherein the airbag arrangement comprises multiple airbags which together surround the display.

3. The impact protection device according to claim 1, wherein the display is arranged at least partially and/or temporarily freely suspended in the vehicle interior.

4. The impact protection device according to claim 1, wherein the display device has a receptacle for the at least one airbag on the rear side of the display device.

5. An impact protection device according to claim 1, wherein the airbag arrangement comprises a bistable retaining and guiding structure which holds the at least one airbag in a non-activated state of the impact protection device, and which includes a guide for the at least one airbag in an activated state of the impact protection device.

6. A motor vehicle with the impact protection device according to claim 1.

7. A method for operating an impact protection device for an occupant of a motor vehicle in a vehicle interior, in which a display device with a display is arranged, with which an airbag arrangement is associated, the impact protection device comprising at least one airbag which is filled with gas and deploys when the impact protection device is activated, wherein the airbag arrangement is configured and arranged such that, when the impact protection device is activated, the at least one airbag surrounds the display, starting from a rear side of the display device and surrounding a peripheral edge region of the display device in a U-shape, and an at least one edge on the display facing the occupant of the motor vehicle, the method comprising:
    detecting an impact; and
    causing the at least one airbag to surround at least one edge on the display facing the occupant of the motor vehicle.

8. The impact protection device according to claim 1, wherein the rear side of the display device comprises a rear surface of the display device.

9. The impact protection device according to claim 1, wherein the periphery edge region surrounded by the airbag is U-shaped.

10. The impact protection device according to claim 1,
wherein the airbag arrangement comprises a plurality of airbags, which comprise the at least one airbag,
wherein the airbag arrangement further comprises a bistable retaining and guiding structure comprising a plurality of clamps, each of the clamps being formed from bent spring steel, and at least one of the clamps being associated with each of the plurality of airbags, and
wherein the bistable retaining and guiding structure is configured to: hold the plurality of airbags in a non-activated state of the impact protection device, guide the plurality of airbags in an activated state of the impact protection device such that the plurality of airbags surrounds the display.

11. The impact protection device according to claim 10, wherein in the non-activated state of the impact protection device, the plurality of clamps of the bistable retaining and guiding structure are each accommodated in a receptacle at the rear side of the display device, and are each in a retaining position retaining the plurality of airbags, and
wherein the plurality of clamps are configured such that, when the impact protection device is activated, the clamps jump from the retaining position to a guiding position such that the clamps move over the edge on the display facing the occupant, pulling the airbags into a deployed position where the airbags surround the display, starting from the rear side of the display device and surrounding the peripheral edge region of the display device, and the edge on the display facing the occupant of the motor vehicle.

* * * * *